UNITED STATES PATENT OFFICE.

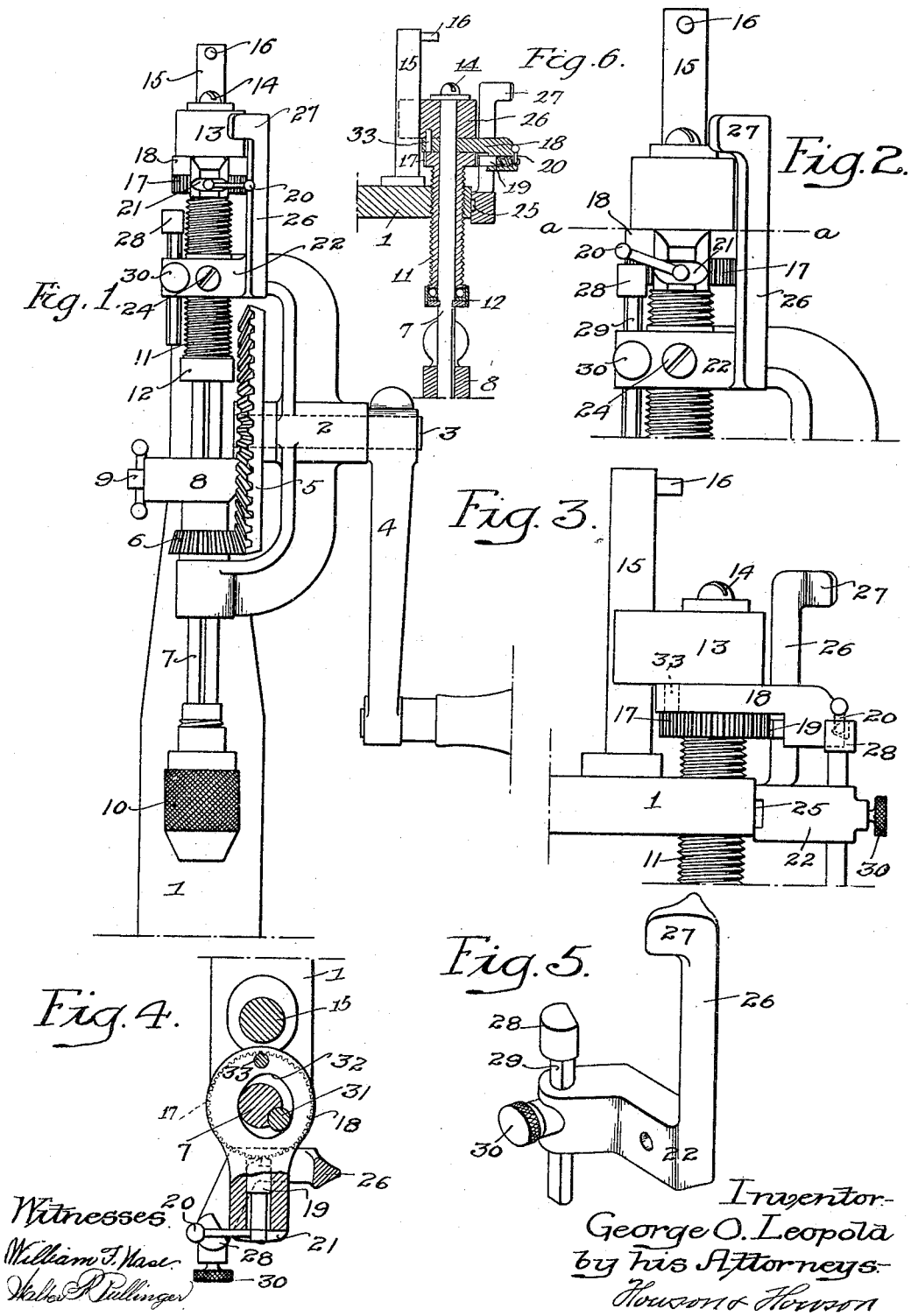

GEORGE O. LEOPOLD, OF PHILADELPHIA, PENNSYLVANIA, ASSIGNOR TO NORTH BRO'S. M'F'G. CO., OF PHILADELPHIA, PENNSYLVANIA, A CORPORATION OF PENNSYLVANIA.

AUTOMATIC STOP FOR DRILLS.

1,103,785.  Specification of Letters Patent.  Patented July 14, 1914.

Application filed February 9, 1914. Serial No. 817,644.

*To all whom it may concern:*

Be it known that I, GEORGE O. LEOPOLD, a citizen of the United States, residing in Philadelphia, Pennsylvania, have invented certain Improvements in Automatic Stops for Drills, of which the following is a specification.

My invention relates to certain improvements in drilling machines driven either by hand or by power, which are provided with means for stopping the movement of the spindle when the drill reaches either end of its work.

The object of my invention is to provide means for adjusting one of the stops so that the feed can be discontinued at any point desired.

In the drawings my invention is illustrated in connection with a hand operated drill.

In the accompanying drawings:—Figure 1, is a front view of a drilling machine illustrating my invention and showing the mechanism shifted to discontinue the feed on the upward movement; Fig. 2, is an enlarged view of the upper portion of Fig. 1, showing the mechanism shifted to cut off the feed on the downward movement; Fig. 3, is a side view of the drilling machine in the position illustrated in Fig. 2; Fig. 4, is a sectional plan view on the line *a—a*, Fig. 2; Fig. 5, is a detached perspective view of the shifting mechanism, and Fig. 6, is a sectional elevation on the line *b—b*, Fig. 2.

The invention is an improvement on that disclosed by me in an application for Patent, Serial No. 789,313, filed Sept. 11th, 1913, therefore, I lay no claim to the construction therein shown.

Referring to the drawings, 1 is the frame of the drill, which can be supported in any suitable manner. This frame has a bearing 2 for the shaft 3, which is provided, in the present instance, with a handle 4, although a pulley may be substituted, if the drill is driven by power. Secured to the inner end of the shaft 3 is a bevel gear wheel 5, which meshes with a pinion 6 splined to the spindle 7. The spindle, in the present instance, has a longitudinal groove therein and a key on the pinion enters the groove so that while the spindle can move vertically in the pinion it must turn therein.

8 is a bearing through which the spindle 7 extends. The bearing has an extension forming a support for the shaft 3, as clearly shown in Fig. 1. In the bearing is a spring bolt 9 having a handle by which it is turned. The bolt is arranged to enter the longitudinal slot in the spindle so as to prevent it from turning when the chuck 10 is to be opened or closed. Loosely mounted on the spindle 7 is a feed screw 11. The lower end of this feed screw rests upon a bearing 12 secured to the spindle, so that the pressure of the spindle, as the tool enters the work, is taken by this bearing, which may be of the ball type. The upper end of the screw rests upon a sliding bearing 13, which is held to the spindle by a screw 14. The bearing is adapted to slide on the vertical guide 15, which is mounted on the upper portion of the frame 1 and there is a stop 16 to limit the upward movement of the sliding bearing 13. This construction is shown and described in a Patent granted to me on the 16th day of September, 1913, No. 1,073,500, and forms no part of the present invention and therefore need not be shown or described in detail.

Secured to the feed screw 11 is a ratchet wheel 17 and mounted between the ratchet wheel and the bearing 13 is a carrier 18 in which is mounted a spring pawl 19. This spring pawl is free to turn in the carrier and is provided with an arm 20. The carrier has a transverse notch 21 into which the arm is forced when in the horizontal position either to the right or the left of the center.

Secured to or forming part of the frame 1 is a shifter 22 attached to the frame, in the present instance by a screw 24, and grooved to receive a rib 25 on the frame which prevents it from turning. The upright 26 of this shifter has a projection 27 at its upper end which is in the path of the arm 20, when it is in the position illustrated in Fig. 1, so that when the spindle nears the completion of its upward movement the arm comes in contact with the projection 27 and the walls of the slot 21, being inclined, act as a cam to withdraw the spring pawl 19, preventing further feeding of the spindle.

When the arm 20 is shifted to the position illustrated in Fig. 2, and the spindle is being fed downward, it will come in contact with a stop 28 on the shifter 22, but, in order to throw out the feed mechanism at any point on its downward stroke, I make the stop 28 vertically adjustable. The stop has an enlarged head beveled at one side to clear the carrier and the shank 29 of this stop extends through an opening in the shifter 22 and a set screw 30 locks the stop in any position desired so that it will disengage the feed mechanism at any predetermined point. The shank 29 of the stop is preferably beveled at one side, as shown, so as to provide a flat surface for the set screw.

In order to cause the carrier 18 to reciprocate and thus feed the screw forward, I mount a roller 31 in a groove in the spindle 7. This roller rests in an opening 32 in the carrier and, as the carrier is mounted on a pivot pin 33 projecting from the bearing 13, the roller acts as a cam to vibrate the carrier and the pawl will engage the wheel 17 and will cause it and the feed screw to move forward one tooth.

I claim:—

1. The combination in a drill, of a frame; a spindle; a feed screw on the spindle; a ratchet wheel on the feed screw; a carrier; a spring pawl on the carrier; an arm on the pawl for shifting it so that it will feed either to the right or to the left; a cam on the spindle for actuating the carrier; a shifter on the frame having upper and lower stops, one on one side and the other on the opposite side of the carrier and in the path of the arm on the pawl, one of said stops being adjustable so that the pawl will be automatically thrown out of engagement with the ratchet wheel at any point desired.

2. The combination in a drill, of a frame; a spindle; a feed screw on the spindle; a ratchet wheel on the feed screw; a carrier; a spring pawl on the carrier; an arm on the pawl for shifting it so that it will feed either to the right or to the left; means on the spindle for actuating the carrier; a shifter on the frame having upper and lower stops, one on one side and the other on the opposite side of the carrier and in the path of the arm of the pawl, the lower stop being vertically adjustable; and means for fastening the lower stop in the position in which it is adjusted.

3. The combination in a drill, of a frame; a spindle; a feed screw on the spindle; a ratchet wheel on the feed screw; a carrier; a spring pawl on the carrier; an arm on the pawl for shifting it so that it will feed either to the right or to the left; means on the spindle for actuating the carrier; a shifter on the frame having upper and lower stops, one on one side and the other on the opposite side of the carrier and in the path of the arm of the pawl, the lower stop being vertically adjustable and consisting of a shank having a head thereon, said shank being flattened on one side, the shifter having an opening through which the shank extends; and a set screw in the shifter bearing against the flattened portion of the shank.

In testimony whereof I have signed my name to this specification in the presence of two subscribing witnesses.

GEORGE O. LEOPOLD.

Witnesses:
Jos. H. KLEIN,
WM. A. BARR.

---

"Copies of this patent may be obtained for five cents each, by addressing the 'Commissioner of Patents, Washington, D. C.'"